United States Patent [19]

Lang et al.

[11] Patent Number: 5,238,914

[45] Date of Patent: Aug. 24, 1993

[54] PROCESS FOR PRODUCING A HIGH-TEMPERATURE SUPERCONDUCTOR CONTAINING BISMUTH, STRONTIUM, CALCIUM AND COPPER

[75] Inventors: Christoph Lang, Frankfurt am Main; Winfried Becker, Bremthal; Carsten Budesheim, Frankfurt am Main, all of Fed. Rep. of Germany

[73] Assignee: Hoechst Aktiengesellschaft, Frankfurt am Main

[21] Appl. No.: 911,004

[22] Filed: Jul. 9, 1992

[30] Foreign Application Priority Data

Jul. 11, 1991 [DE] Fed. Rep. of Germany ....... 4122893

[51] Int. Cl.$^5$ .................. C01B 13/36; C01F 11/44; C01G 3/02; C01G 29/00
[52] U.S. Cl. ..................................... 505/1; 423/593; 423/604; 505/73; 505/782
[58] Field of Search ................. 505/738, 1, 782; 423/604, 593

[56] References Cited

U.S. PATENT DOCUMENTS

| | | | |
|---|---|---|---|
| 5,077,265 | 12/1991 | Ritter | 505/738 |
| 5,100,871 | 3/1992 | Chen | 505/738 |
| 5,147,848 | 9/1992 | Chang | 505/738 |

OTHER PUBLICATIONS

Slusarenko "Sol gel preparations and physical properties of the superconducting phase $Bi_1Sr_1Ca_1Cu_2O_8$", Journal of Solid State Chemistry v. 79 (no month provided) 1989 pp. 277–81.

Akihiko et al., Patent Abstracts of Japan, JP 1197352 (published Aug. 9, 1989 (Abstract plus Document as Laid–Open).

Tatsuya et al., Patent Abstracts of Japan, JP 1079060 (published Mar. 24, 1989.

Chen, F. H., Journal of Materials Science, No. 7, 3338–3346 (1990).

Chen, F. H. Materials Letters, No. 6/7, 228–232 (1989).

Primary Examiner—Paul Lieberman
Assistant Examiner—John Boyd
Attorney, Agent, or Firm—Curtis, Morris & Safford

[57] ABSTRACT

The invention relates to a process for producing a bismuth-, copper-, strontium- and calcium-containing high-temperature superconductor, in which an aqueous solution is produced which has a pH of 0.5–4 and which contains the metals in an atomic ratio corresponding to a high-temperature superconductor, the solution is combined with an oxalic acid solution to precipitate the metals quantitatively as oxalates, the oxalates formed are separated off and decomposed thermally to form the oxides and the latter are reacted in the presence of oxygen at temperatures above 700° C. to form the desired high-temperature superconductor. The process comprises concentrating the aqueous solution of the metal until a precipitate begins to appear and using the oxalic acid as a solution in an organic solvent which is miscible with water The oxalates are decomposed at 550–700° C. in the presence of oxygen.

7 Claims, No Drawings

PROCESS FOR PRODUCING A HIGH-TEMPERATURE SUPERCONDUCTOR CONTAINING BISMUTH, STRONTIUM, CALCIUM AND COPPER

The invention relates to a process for producing a high-temperature superconductor containing the elements bismuth, copper, strontium and calcium in which the metals are precipitated as an oxalate mixture which is then further processed, first to produce a fine-grained oxidic precursor of high reactivity, and then to produce a superconductor.

In the family of superconductor ceramics which are formed from the elements bismuth, strontium, calcium and copper, three representatives are essentially known and have been sufficiently investigated. These are $Bi_2Sr_2Ca_2Cu_3O_x$, known as "3-layer compound" and having a critical temperature of 110K (H. Maeda et al., Japan. J. Appl. Phys. 27 (1988), L209), the compound ($Bi_2Sr_2CaCu_2O_{10-\delta}$ ("2-layer compound") having a critical temperature of 92K (cf. M. A. Subramaniam et al., Science 239, 1988, page 1015) and the compound $Bi_2Sr_2CuO_{8-\delta}$ ("1-layer compound") having a critical temperature around 10K (cf. R. M. Fleming et al., Physica C 172 (1990) 13).

Of this structural family, only the two first-named compounds are at present suitable for application above the temperature of liquid nitrogen. Another technically relevant superconducting compound having a critical temperature of 77K is $YBa_2Cu_3O_{7-x}$ (92K).

The superconductor is actually synthesized from the oxides by solid-state reaction at high temperatures. In this connection, the mean grain size of the precursor used is critical for the production of the superconductor. A precursor obtained by roasting a mixture of metal oxides (or carbonates, nitrates etc.) has insufficient sintering activity. This causes very long reaction times before single-phase superconductors are obtained. Thus, Freyhardt et al. (Supercond. Sci. Technol. 3 (1990), 602) describe that 600 hours are necessary for the single-phase preparation of 3-layer material.

The preparation of coprecipitates for the production of (bismuth-free) superconductors of the type Y-Ba-Cu-O has been repeatedly described (for example, EP-A-0 303 249, EP-A-0 287 064 or EP-A-0 313 148 Al, DE-A-3 930 116).

The production of a coprecipitate containing Bi-Pb-Sr-CaCu by precipitation with aqueous oxalic acid solution and the further processing to produce a superconductor is described in J. Hagberg et al., Physica C 160 (1989) page 369. The precipitation takes several days and the results are difficult to reproduce.

The object was therefore to provide a simple process for precipitating coprecipitates, which can be further processed to form high-temperature superconducting metal oxides, by means of oxalate, which process is exactly reproducible and by which process the precipitated coprecipitates can be further processed more simply, more rapidly and with greater energy saving to produce high-temperature superconducting compounds.

A process for producing a bismuth-, copper-, strontium and calcium-containing high-temperature superconductor has now been found in which an aqueous solution is produced which has a pH between 0.5 and 4 and which contains the metals in an atomic ratio corresponding to a high-temperature superconductor, the solution is combined with an oxalic acid solution in order to precipitate the metals quantitatively as oxalates, the oxalates formed are separated off and thermally decomposed to form the oxides, and the latter are reacted in the presence of oxygen at temperatures above 700° C. to form the desired high-temperature superconductor. The process comprises concentrating the aqueous solution of the metals until a precipitate begins to appear, using the oxalic acid as a solution in a solvent which is miscible with water and decomposing the oxalates at 550–700° C. in the presence of oxygen.

The specified process is particularly suitable for bismuth-containing superconductors of the formulae $Bi_2(Sr, Ca)_2CuO_x$, $Bi_4(Sr, Ca)_5Cu_3O_x$, $Bi_2Sr_2Ca_2Cu_3O_3O_x$. In all the compounds, bismuth can be replaced up to 50 mol % by lead and/or antimony. Strontium or calcium may be partially replaced by Y. Furthermore, the precursor $Bi_{1.8}Pb_{0.4}Sr_2Ca_{2.2}Cu_3O_x$ can be prepared (to produce the 3-layer compound). Other compositions of precursors can also be made up.

After the decomposition of the oxalate precipitate and the removal of the residual carbon at 550–700° C., a precursor powder of high reactivity is obtained which can readily be further processed (by further heating in the presence of oxygen) to form superconductors.

In a preferred process, aqueous solutions having a known content of water-soluble salts of the elements strontium, calcium and copper (and also, optionally, of lead) are combined in a first process step. The content of the solutions is checked by complexometric titration. Suitable water-soluble salts are, for example, chlorides and, in particular, nitrates. The pH of the solution does not have to be adjusted in this step. An entrainment of impurities, in particular of alkaline metals is thereby avoided. The solution is then concentrated, for example evaporated down at normal pressure, until a first precipitate of undefined composition is detectable. This is just redissolved by adding distilled water.

A solution of a readily soluble bismuth salt, in particular bismuth nitrate, is then added. To avoid undefined bismuth precipitates, the pH of the solution (now containing all the necessary metals) should be adjusted between 0.5 to 4, for example, by adding nitric acid.

Concentration is then carried out again until a first precipitate appears and the latter is dissolved in a little distilled water. The solution now obtained contains approximately 40% by weight of metal nitrates.

An alternative is to combine all the solutions of the metal salts, redissolve any precipitate appearing by means of concentrated nitric acid and then to evaporate down.

The concentration reduces the amount of water present in the subsequent coprecipitation, so that the still existent low solubility of the metal oxalates involved in water is no longer important.

The oxalates are then actually coprecipitated. Advantageously, the concentrated aqueous metal salt solution is introduced in as finely dispersed a form as possible into a solution of oxalic acid in a solvent which is miscible with water. Very well suited is the nebulization of the aqueous solution by means of ultrasound, in which process the liquid droplets produced sink downwards and come into contact with the surface of the (stirred) oxalic acid solution; but the dropwise addition to a stirred solution also results in a very fine-grained precipitate. Electronmicrography of the coprecipitate thus obtained in conjunction with EDX analysis reveal very good homogeneity in both cases.

It is preferred if oxalic acid is used in excess, in particular 1.1 to 3 times, particularly preferably 1.5 to 3 times, of the theoretically required amount.

The solvent used must have an adequate solubility for oxalic acid and the oxalates formed must virtually not dissolve in it. Very well suited are aliphatic alcohols such as methanol, ethanol, propanol and acetone. The amount of the solvent should be at least 15 times, in particular 20 to 40 times, the volume of the aqueous solution.

The pure-white precipitate obtained can be separated off after a short stirring time, for example 30 minutes. It is then washed with cold solvent.

The washed and dried oxalate mixture can be converted without difficulty into a reactive oxide mixture by heating for at least two hours at temperatures between 550 and 700° C. in the presence of oxygen. In this process, $CO_2$ is first split off, in part even at temperatures from 300 to 550° C. The residue, which still contains carbon, is only converted into a pure oxide mixture by heating for several hours in the presence of oxygen (for example, in air). At 500° C., this oxidation takes about 10 h and at 700° C. about 5 h. The decomposition of the oxalates can be monitored by DTA or checking the loss in weight.

The precursor powder obtained is so reactive that it usually already contains small proportions of superconductors. In the case of a composition corresponding to the 3-layer compound, fairly large proportions of the 2-layer compound are produced at temperatures of about 750° C. even with short reaction times (less than 10 hours). Since this compound usually forms only very slowly, this shows the reactivity of the oxide mixture. On the other hand, at about 845° C., the same oxide mixture reacts to form pure 3-layer compound.

It was found that the residual carbon content of the decomposed oxalates is directly dependent on the decomposition temperature. In air at 450° C. 3.8% by weight of residual carbon was still present and at 700° C. 0.2% by weight was still present after a decomposition time of 10 h in each case. Under reduced oxygen partial pressure (2% oxygen/98% nitrogen), the residual content of carbon at 700° C. can be reduced to 900 ppm.

To ensure a direct reaction of the (reactive) starting oxides to form the desired superconductor, the coprecipitated oxalates should, if possible, be decomposed in the 300–700° C. range. The process according to the invention yields very reactive powder after the decomposition of the oxalates. The reproducibility of the composition of the precursor powder is very good from mix to mix.

The exact adjustment of the composition of the precursor powder is critical for the single-phase preparation of superconductors. The following analytical values, obtained by means of ICP-AES, were determined for various original weighings:

| | |
|---|---|
| Original weighing | $Bi_{1.8}Pb_{0.33}Sr_{1.93}Ca_{1.93}Cu_3O_x$ |
| ICP-AES | $Bi_{1.74}Pb_{0.34}Sr_{1.92}Ca_{1.81}Cu_3O_x$ |
| Original weighing | $Bi_{1.8}Pb_{0.4}Sr_2Ca_{2.2}Cu_3O_x$ |
| ICP-AES | $Bi_{1.75}Pb_{0.42}Sr_{1.97}Ca_{2.13}Cu_3O_x$ |
| Original weighing | $Bi_2Sr_2CaCu_2O_x$ |
| ICP-AES | $Bi_{1.98}Sr_{1.95}Ca_{1.02}Cu_2O_x$ |

The deviations from the ideal composition are within the accuracy of measurement of the ICP analyzes.

The invention is explained in greater detail by the following examples without being restricted to the embodiments presented.

EXAMPLE 1

The content of aqueous solutions of $Pb(NO_3)_2$, $Sr(NO_3)_2$, $Ca(NO_3)_2$ and $Cu(NO_3)_2$ is determined complexometrically. These solutions are combined in the ratio $Pb_{0.33}Sr_{1.93}Ca_{1.93}Cu_3O_x$. The clear solution is evaporated down to the first precipitate. The precipitate is redissolved in a little distilled water and an acidic solution of $Bi(NO_3)_3$, whose metal content was also determined complexometrically, is added. The metal salt content of the solution corresponds to the ratio $Bi_{1.8}Pb_{0.33}Sr_{1.93}Ca_{1.93}Cu_3O_x$. The solution is again evaporated until a deposit is precipitated and the latter is redissolved in some distilled water. The resultant solution, which has a lower pH of less than 1, is added dropwise to a solution of double the equivalent of oxalic acid in a 20-fold amount of ethanol (relative to the amount of water). The precipitate produced is filtered off, washed with a little ethanol and calcined. For this purpose, the oxalates are heated in powder form for 10 h at 450° C., held for 10 h at this temperature, heated for 5 h at 700° C., held there for 10 h and then cooled. The powder precalcined in this way is characterized as follows:

a. The composition according to ICP-AES analysis is $Bi_{1.8}Pb_{0.33}Sr_{1.93}Ca_{1.93}Cu_3O_x$.
b. According to a Sedigraph measurement, the mean grain size is $d_{50}=1.9$ μm.
c. The residual carbon content is 0.21%.
d. The X-ray powder patterns show, in addition to high amorphous proportions, little CuO and some alkaline earth plumbate.
e. SEM pictures show uniform, homogeneous grains.

EXAMPLE 2

A mix having the composition $Bi_{1.8}Pb_{0.4}Sr_2Ca_{2.2}Cu_3O_x$ is treated as in Example 1. According to ICP-AES analysis, the composition of the precalcined powder is $Bi_{1.75}Pb_{0.42}Sr_{1.97}Ca_{2.13}Cu_3O_x$. The other characteristic data correspond to the mix from Example 1 within the accuracy of measurement.

EXAMPLE 3

A mix of the composition $Bi_2Sr_2CaCu_2O_x$ is also coprecipitated and calcined analogously to Example 1. The substantially quantitative precipitation of the homogeneous and fine-grained powder reveals itself with the value $Bi_{1.98}Sr_{1.95}Ca_{1.02}Cu_2O_x$ in the ICP-AES analysis.

We claim:

1. A process for producing a bismuth-, copper-, strontium- and calcium-containing high-temperature superconductor, in which an aqueous solution is produced which has a pH between 0.5 and 4 and which contains the metals in an atomic ratio corresponding to a high-temperature superconductor, the solution is combined with an oxalic acid solution in order to precipitate the metals quantitatively as oxalates, the oxalates formed are separated off and thermally decomposed to form the oxides, and the latter are reacted in the presence of oxygen at temperatures above 700° C. to form the desired high-temperature superconductor, which process comprises concentrating the aqueous solution of the metals a precipitate begins to appear subsequently redissolving said precipitate with water to form a second aqueous solution and thereafter adding said second aqueous solution to an oxalic acid solution using the oxalic acid as a solution in an organic solvent which is miscible with water and decomposing the oxalates at 550–700° C. in the presence of oxygen.

2. The process as claimed in claim 1, wherein bismuth is partially replaced by lead.

3. The process as claimed in claim 1, wherein strontium or calcium is partially replaced by lanthanum, a lanthanide element or yttrium.

4. The process as claimed in claim 1, wherein the organic solvent miscible with water is methanol, ethanol, propanol or acetone.

5. The process as claimed in claim 1, wherein the coprecipitate is separated off from the liquid phase not more that 30 minutes after completing the combination of the solutions.

6. A process for producing a bismuth-, copper-, strontium- and calcium-containing oxidic precursor of high reactivity to produce a high-temperature superconductor, in which an aqueous solution is produced which has a pH between 0.5 and 4 and which contains the metals in an atomic ratio corresponding to a high-temperature superconductor, the solution is combined with an oxalic acid solution in order to precipitate the metals quantitatively as oxalates, the oxalates formed are separated off and thermally decomposed to form the oxides, which process comprises concentrating the aqueous solution of the metals until a precipitate begins to appear subsequently redissolving said precipitate with water to form a second aqueous solution and thereafter adding said second aqueous solution to an oxalic acid solution, using the oxalic acid as a solution in an organic solvent miscible with water and decomposing the oxalates at 550–700° C. in the presence of oxygen.

7. The process as claimed in claim 6, wherein the aqueous solution of the metal salts is added to the oxalic acid solution.

* * * * *